US010440394B2

(12) United States Patent
Han et al.

(10) Patent No.: US 10,440,394 B2
(45) Date of Patent: Oct. 8, 2019

(54) CONTEXT ADAPTIVE SCAN ORDER FOR ENTROPY CODING

(71) Applicant: GOOGLE INC., Mountain View, CA (US)

(72) Inventors: Jingning Han, Santa Clara, CA (US); Ching-Han Chiang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 289 days.

(21) Appl. No.: 15/259,189

(22) Filed: Sep. 8, 2016

(65) Prior Publication Data

US 2018/0070106 A1 Mar. 8, 2018

(51) Int. Cl.

| H04N 7/12 | (2006.01) |
|---|---|
| H04N 19/129 | (2014.01) |
| G06T 9/00 | (2006.01) |
| H04N 19/176 | (2014.01) |
| H04N 19/13 | (2014.01) |

(Continued)

(52) U.S. Cl.
CPC ........... H04N 19/60 (2014.11); H04N 19/129 (2014.11); H04N 19/134 (2014.11); H04N 19/136 (2014.11); H04N 19/176 (2014.11); H04N 19/18 (2014.11); H04N 19/192 (2014.11); H04N 19/91 (2014.11)

(58) Field of Classification Search
CPC .... H04N 19/60; H04N 19/192; H04N 19/136; H04N 19/129; H04N 19/134; H04N 19/91; H04N 19/18; H04N 19/176
USPC .......................................................... 375/240
See application file for complete search history.

(56) References Cited

U.S. PATENT DOCUMENTS

| 8,311,119 B2 | 11/2012 | Srinivasan |
|---|---|---|
| 8,737,613 B2 | 5/2014 | Lee et al. |

(Continued)

FOREIGN PATENT DOCUMENTS

EP 2165542 A2 3/2010

OTHER PUBLICATIONS

Bankoski, et al., "Technical Overview of VP8, An Open Source Video Codec for the Web", Jul. 11, 2011, 6 pp.

(Continued)

*Primary Examiner* — Susan E. Hodges
(74) *Attorney, Agent, or Firm* — Young Basile Hanlon & MacFarlane, P.C.

(57) ABSTRACT

Video coding using a context adaptive scan order for entropy coding may include decoding a current block by identifying a context adaptive scan order for entropy decoding a transform block, which may include identifying non-zero-coefficient probabilities for the transform block such that each location in the transform block corresponds to a respective non-zero-coefficient probability from the non-zero-coefficient probabilities, assigning a respective context adaptive scan order position to each location in the transform block in descending magnitude order of the respective corresponding non-zero-coefficient probabilities such that the context adaptive scan order position for each location exceeds the context adaptive scan order position assigned to entropy coding context locations for the respective location, entropy decoding transform coefficients from the encoded video stream based on the context adaptive scan order, and reconstructing the decoded block based on the transform block.

20 Claims, 11 Drawing Sheets

(51) Int. Cl.

| | |
|---|---|
| *H04N 19/60* | (2014.01) |
| *H04N 19/18* | (2014.01) |
| *H04N 19/91* | (2014.01) |
| *H04N 19/134* | (2014.01) |
| *H04N 19/136* | (2014.01) |
| *H04N 19/192* | (2014.01) |

(56) References Cited

U.S. PATENT DOCUMENTS

| | | | |
|---|---|---|---|
| 8,929,440 | B2 | 1/2015 | Nguyen et al. |
| 2003/0128753 | A1 | 7/2003 | Lee et al. |
| 2008/0310745 | A1* | 12/2008 | Ye .................. H04N 19/503 382/238 |
| 2011/0243220 | A1 | 10/2011 | Seregin et al. |
| 2015/0110173 | A1 | 4/2015 | Bultje et al. |
| 2018/0020239 | A1* | 1/2018 | Lee .................. H04N 19/60 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion for Internation Application No. PCT/US2017/044639 dated Sep. 12, 2017; pp. 1-19.

Yoo et al.; "Adaptive Scan Pattern for Quantized Coefficients in Intra Coding of H.264"; IEICE Trans. ENF & SYST. vol. E92-D. No. 4; Apr. 2009; pp. 750-752.

Chiang et al.; "A Contstrained Adaptive Scan Order Approach to Transform Coefficient Entropy Coding"; IEEE International Conference on Acoustics, Speech and Signal Processing; Mar. 1, 2017; pp. 1298-1302.

Marpe et al., "Context-Based Adaptive Binary Arithmetic Coding in the H.265/AVC Video Compression Standard"; IEEE Transactions on Circuits and Systems for Video Technology, vol. 13, No. 7, Jul. 1, 2003; pp. 620-636.

Mukherjee, "A Technical Overview of VP9—The Latest Open-Source Video Codec" SMPTE 2013 Annual Technical Conference & Exhibition, Oct. 22, 2013; pp. 1-17.

* cited by examiner

CONTEXT ADAPTIVE SCAN ORDER FOR ENTROPY CODING

BACKGROUND

Digital video can be used, for example, for remote business meetings via video conferencing, high definition video entertainment, video advertisements, or sharing of user-generated videos. Due to the large amount of data involved in video data, high-performance compression may be advantageous for transmission and storage. Accordingly, it would be advantageous to provide high-resolution video transmitted over communications channels having limited bandwidth, such as video coding using a context adaptive scan order for entropy coding.

SUMMARY

This application relates to encoding and decoding of video stream data for transmission or storage. Disclosed herein are aspects of systems, methods, and apparatuses for encoding and decoding using context adaptive scan order for entropy coding.

An aspect is a method for video decoding using a context adaptive scan order for entropy coding. Video decoding using a context adaptive scan order for entropy coding may include receiving an encoded video stream, and generating, by a processor in response to instructions stored on a non-transitory computer readable medium, a decoded block by decoding a current block of a current frame of a video stream from the encoded video stream. Decoding the current block may include identifying a context adaptive scan order for entropy decoding a transform block. Identifying the context adaptive scan order may include identifying non-zero-coefficient probabilities for the transform block such that each location in the transform block corresponds to a respective non-zero-coefficient probability from the non-zero-coefficient probabilities, identifying a current location in the transform block corresponding to a maximal non-zero-coefficient probability from the non-zero-coefficient probabilities wherein the context adaptive scan order omits an assigned scan order position for the current location, and identifying an entropy coding context location in the transform block based on the current location. On a condition that that context adaptive scan order includes an assigned scan order position for the entropy coding context location, identifying the context adaptive scan order may include identifying a minimal unassigned scan order position from the context adaptive scan order as an assigned scan order position for the current location. On a condition that the context adaptive scan order omits an assigned scan order position for the entropy coding context location, identifying the context adaptive scan order may include determining an assigned scan order position for the entropy coding context location, and identifying a minimal unassigned scan order position from the context adaptive scan order as an assigned scan order position for the current location such that the assigned scan order position for the current location exceeds the assigned scan order position for the entropy coding context location. Identifying the context adaptive scan order may include generating a transform coefficient by entropy decoding the transform coefficient from the encoded video stream based on the context adaptive scan order, including the transform coefficient in the transform block, and reconstructing the decoded block based on the transform block. Video decoding using a context adaptive scan order for entropy coding may include presenting or storing the decoded block.

Another aspect is a method for video decoding using a context adaptive scan order for entropy coding. Video decoding using a context adaptive scan order for entropy coding may include receiving an encoded video stream and generating, by a processor in response to instructions stored on a non-transitory computer readable medium, a decoded block by decoding a current block of a current frame of a video stream from the encoded video stream. Decoding the current block may include identifying a context adaptive scan order for entropy decoding a transform block. Identifying the context adaptive scan order may include identifying non-zero-coefficient probabilities for the transform block such that each location in the transform block corresponds to a respective non-zero-coefficient probability from the non-zero-coefficient probabilities, assigning a respective context adaptive scan order position to each location in the transform block in descending magnitude order of the respective corresponding non-zero-coefficient probabilities such that the context adaptive scan order position for each location exceeds the context adaptive scan order position assigned to entropy coding context locations for the respective location, generating the transform block by entropy decoding transform coefficients from the encoded video stream based on the context adaptive scan order, including the transform coefficient in the transform block, and reconstructing the decoded block based on the transform block. Video decoding using a context adaptive scan order for entropy coding may include presenting or storing the decoded block.

Another aspect is a method for video encoding using a context adaptive scan order for entropy coding. Video encoding using a context adaptive scan order for entropy coding may include generating, by a processor in response to instructions stored on a non-transitory computer readable medium, an encoded block by encoding a current block of a current frame of a video stream. Encoding the current block may include generating a transform block based on the current block, and identifying a context adaptive scan order for entropy coding the transform block. Identifying the context adaptive scan order may include identifying non-zero-coefficient probabilities for the transform block such that each location in the transform block corresponds to a respective probability that the location includes a non-zero coefficient, identifying a current location in the transform block corresponding to a maximal non-zero-coefficient probability from the non-zero-coefficient probabilities wherein the context adaptive scan order omits an assigned scan order position for the current location, identifying an entropy coding context location in the transform based on the current location. On a condition that that context adaptive scan order includes an assigned scan order position for the entropy coding context location, encoding the current block may include may include identifying a minimal unassigned scan order position from the context adaptive scan order as an assigned scan order position for the current location. On a condition that the context adaptive scan order omits an assigned scan order position for the entropy coding context location, encoding the current block may include may include determining an assigned scan order position for the entropy coding context location, and identifying a minimal unassigned scan order position from the context adaptive scan order as an assigned scan order position for the current location such that the assigned scan order position for the current location exceeds the assigned scan order position for the entropy coding context location. Encoding the current block may include may include identifying a transform coefficient from the transform block based on the context adaptive scan order, generating an entropy coded value by entropy coding the transform coefficient, and including the entropy coded value in an output bitstream. Video encoding using a context adaptive scan order for entropy coding may include transmitting or storing the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame.

The residual information may be further compressed by transforming the residual information into transform coefficients, and entropy coding the transform coefficients in a defined scan order, such as a zigzag scan order, that tends to cluster zero value coefficients at the end of the scan order. Probability distributions for entropy coding the non-zero transform coefficients may be identified based on context, which may include previously coded coefficients in the transform block. In some implementations, the distribution of non-zero coefficients may differ from the expected distribution corresponding to the defined scan order, and encoding the transform coefficients using the defined scan order may inefficiently encode zero value coefficients interspersed with the non-zero coefficients.

Video coding using a context adaptive scan order, which may be a context-constrained non-zero-probability-adaptive scan order, for entropy coding may improve coding efficiency by generating a context adaptive scan order, wherein the positions of transform coefficients in the context adaptive scan order is based on descending probability that the respective coefficient is a non-zero coefficient. Generating the context adaptive scan order may include maintaining the correspondence between transform coefficients and corresponding context coefficients by assigning the transform coefficients context adaptive scan order positions higher than the context coefficients, which may have lower non-zero-coefficient probabilities. The context coefficients may be included in the context adaptive scan order based on a defined scan order, such as the zigzag scan order, or based on recursively, or topologically, assigning the context coefficients context adaptive scan order positions.

Figure 1:
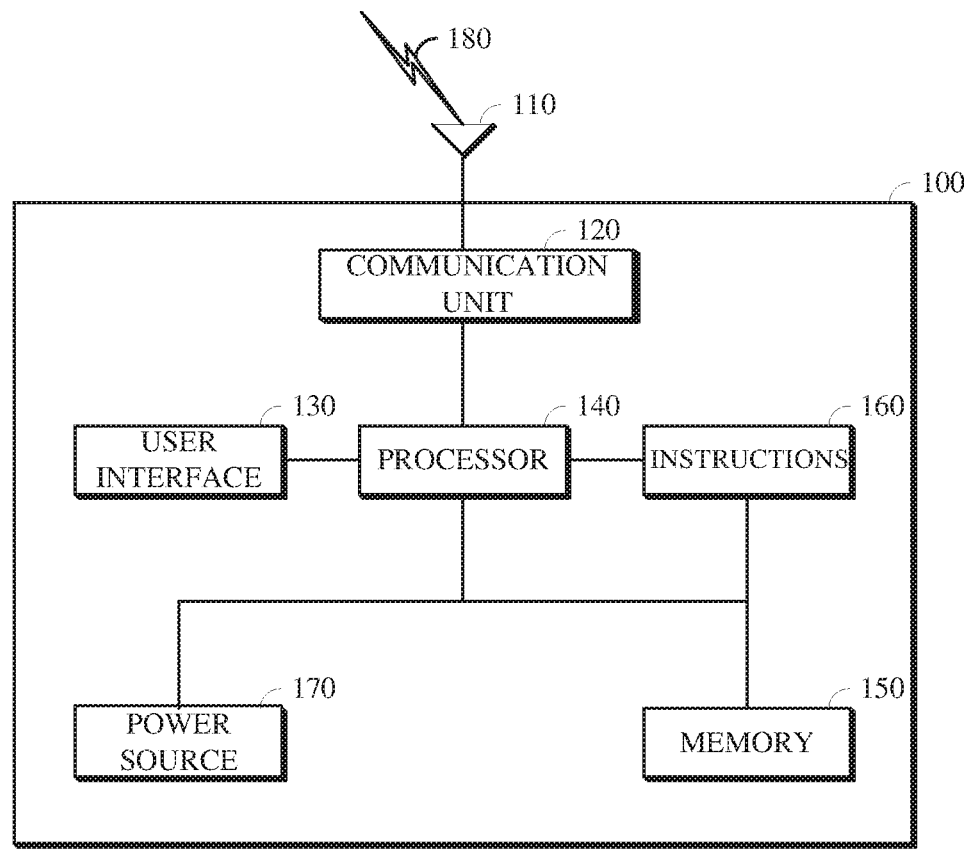
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the computing device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180 (180A, 180B, 180C).

The communication unit 120 can be configured to transmit or receive signals via a wired or wireless electronic communication medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultraviolet (UV), visible light, fiber optic, wireline, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the computing device 100, such as the power source 170. Although shown as a single unit, the UI 130 may include one or more physical units. For example, the UI 130 may include an audio interface for performing audio communication with a user, and a touch display for performing visual and touch-based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, the communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the computing device 100. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
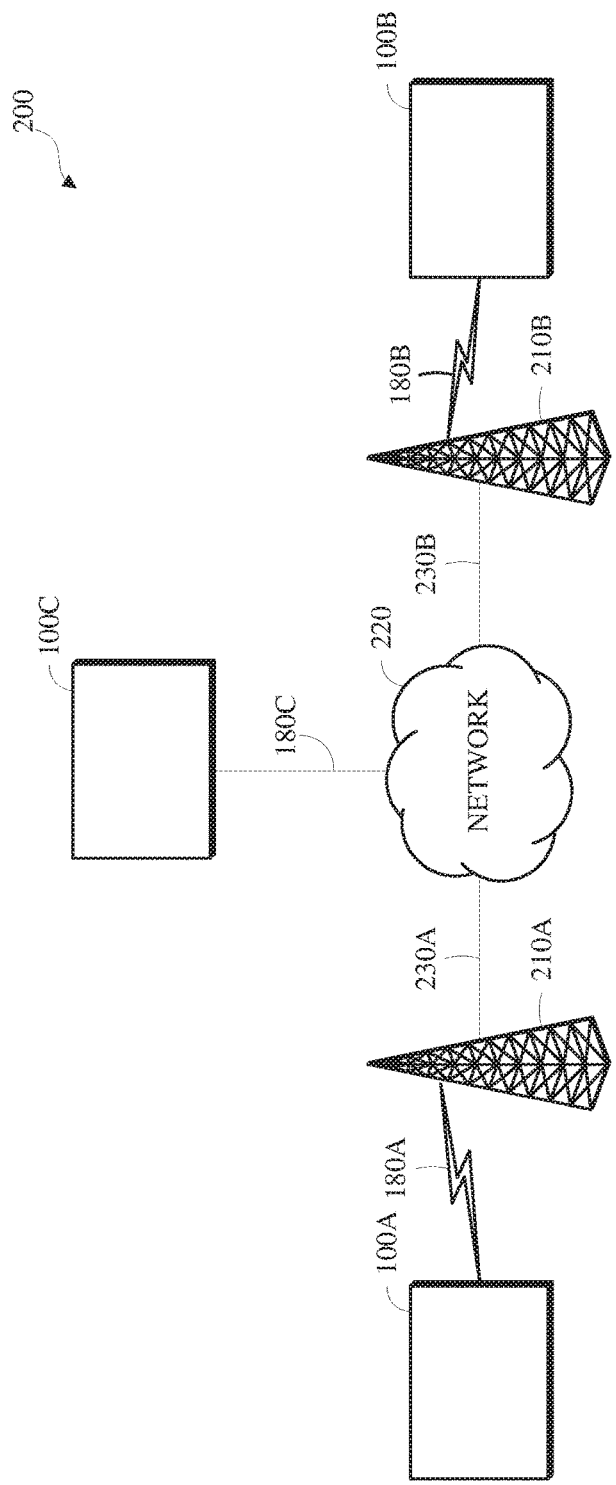
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A, 100B, 100C, one or more access points 210A, 210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, as shown the computing and communication devices 100A, 100B may be user devices, such as a mobile computing device, a laptop, a thin client, or a smartphone, and computing and the communication device 100C may be a server, such as a mainframe or a cluster. Although the computing and communication devices 100A, 100B are described as user devices, and the computing and communication device 100C is described as a server, any computing and communication device may perform some or all of the functions of a server, some or all of the functions of a user device, or some or all of the functions of a server and a user device.

Each computing and communication device 100A, 100B, 100C can be configured to perform wired or wireless communication. For example, a computing and communication device 100A, 100B, 100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
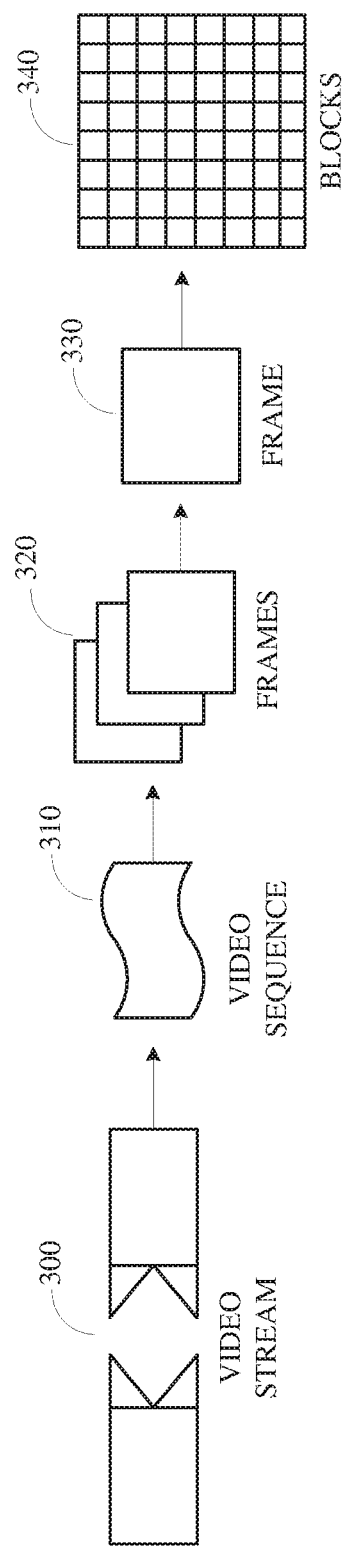
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
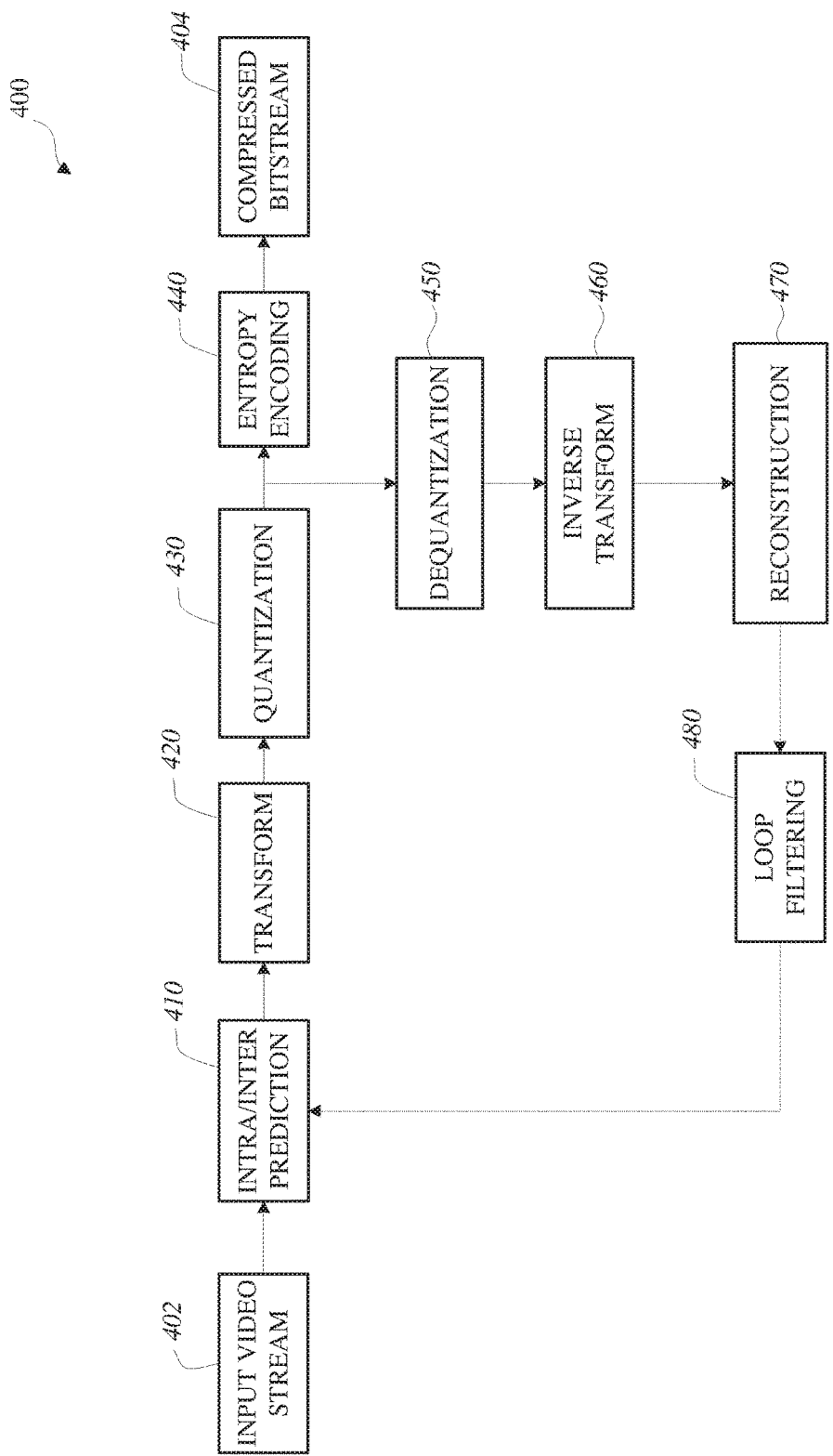
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
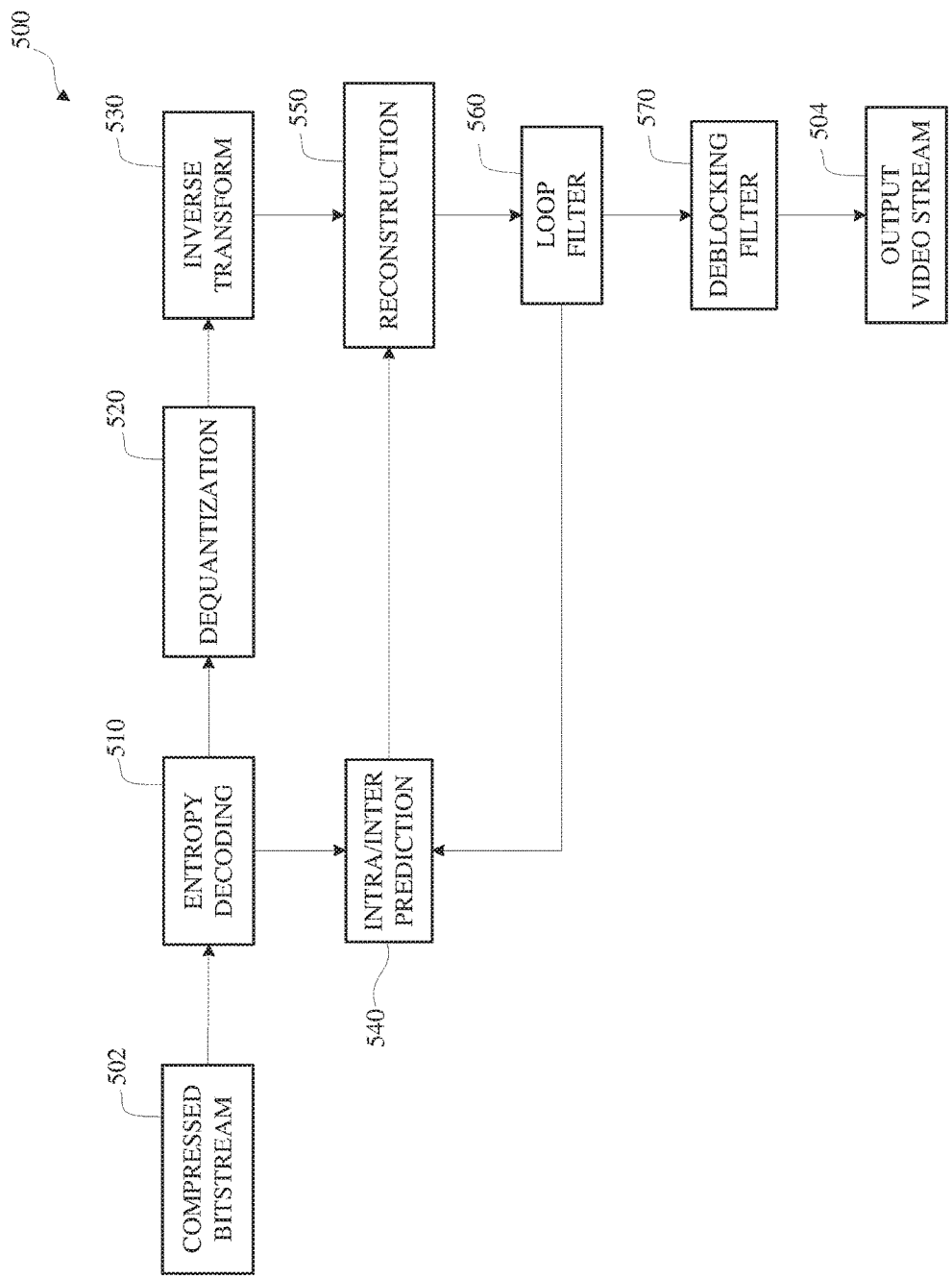
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
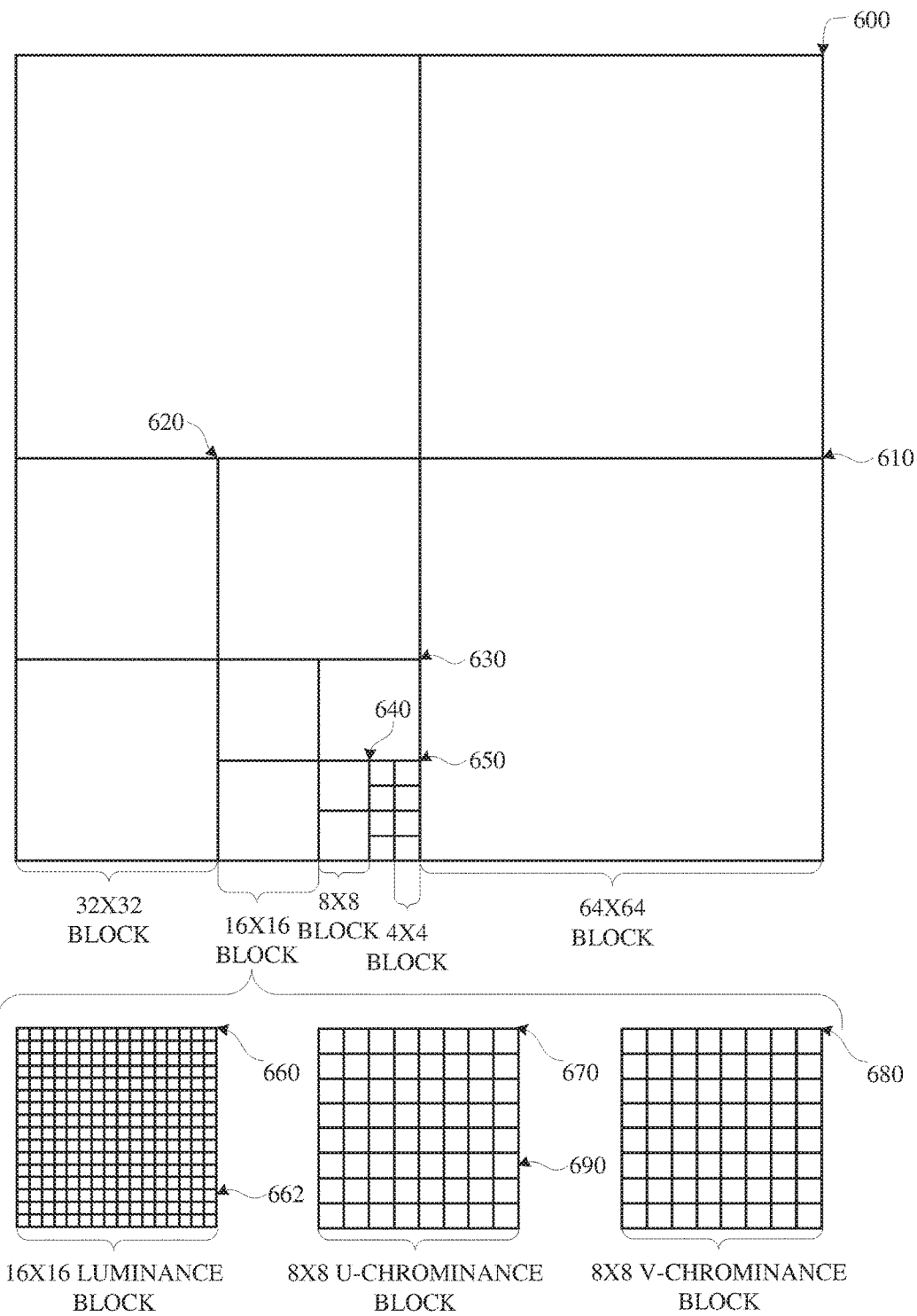
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
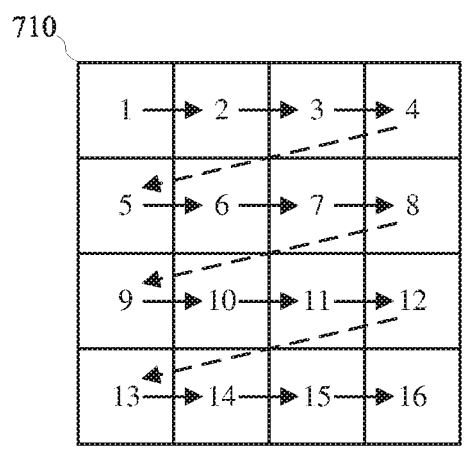
FIG. 7 shows diagrams of an example of a transform block and examples of entropy coding scan orders in accordance with implementations of this disclosure.
Figure 7:
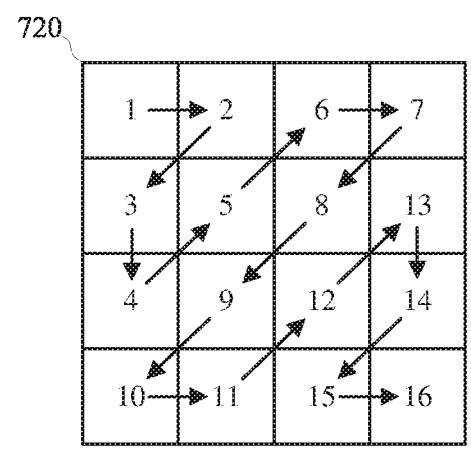

FIG. 7 shows diagrams of an example of a transform block 700 and examples of entropy coding scan orders 710, 720 in accordance with implementations of this disclosure.

In some implementations, an element of an encoder, such as the transform unit 420 of the encoder 400 shown in FIG. 4, may generate the transform block 700. In some implementations, an element of an encoder, such as the quantization unit 430 of the encoder 400 shown in FIG. 4, may quantize the transform block 700 to generate a quantized transform block. As used herein, unless otherwise expressly indicated, the term "transform block" may refer to a block, matrix, or other data structure, of transform coefficients or quantized transform coefficients. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In the transform block 700 shown in FIG. 7, the value shown in each location indicates the transform coefficient value for the respective location. For clarity, the location of a transform coefficient for a block may be referred to as the "position," "location," or variations thereof, of the transform coefficient. As used herein references to "proximity," "spatial proximity," or "distance" between transform coefficients may indicate proximity or distance in the transform coefficient matrix representation of the transform coefficients for a block.

In some implementations, the transform block 700 may be processed in a scan order to improve entropy coding efficiency. For example, the scan order may tend to group zero value coefficients at the end of the block and consecutive zero value coefficients at the end of a block in scan order may be omitted from the output bitstream without loss of data.

In some implementations, entropy coding may include encoding the coefficients of a transform block 700 in a scan order, such as a horizontal scan order 710, a vertical scan order (not shown), a diagonal scan order (not shown), or a zigzag scan order 720. In the horizontal scan order 710 and the zigzag scan order 720 shown in FIG. 7, the values shown in each block represent the order that the corresponding coefficient is entropy coded. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In some implementations, encoding the coefficients of a transform coefficient matrix in a scan order may include generating a one-dimensional array, such as a vector, of the transform coefficients by including each transform coefficient in the vector in scan order. For example, the DC coefficient, which may be the coefficient in the top left corner of the transform coefficient matrix may be the first element of the scan order vector, may have a transform coefficient matrix location of (0,0) and may have a scan order position, or context adaptive scan order position, of (0).

In FIG. 7, the scan order shown at 720 indicates a zigzag scan order. In an example, a transform block generated using a 2D DCT transform may be encoded using a zigzag scan order 720, and coefficients with smaller frequencies in both horizontal and vertical directions may tend to be to earlier (lower scan order) in the zigzag scan order.

As used herein, the terms "order," "scan position," "vector position," or variations thereof of a transform coefficient indicate a relative position, or index, of the transform coefficient in the scan order or the scan order vector. Although FIG. 7 shows examples of sequential scan patterns, the coefficients may be coded using a non-contiguous scan pattern.

Figure 8:
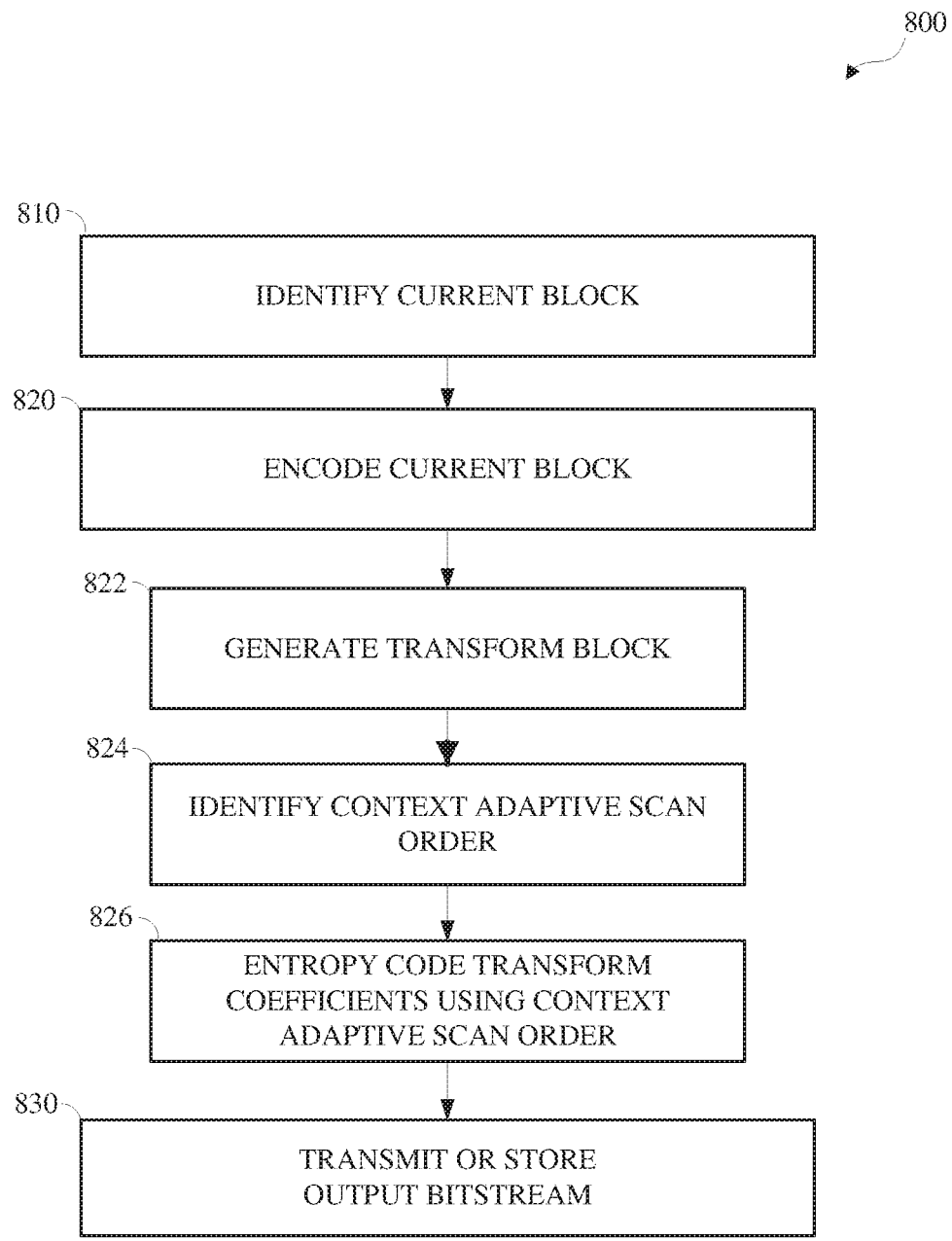
FIG. 8 is a flowchart diagram of encoding using a context adaptive scan order for entropy coding in accordance with implementations of this disclosure.

FIG. 8 is a flowchart diagram of encoding using a context adaptive scan order for entropy coding in accordance with implementations of this disclosure. In some implementations, encoding using a context adaptive scan order for entropy coding may be implemented in an encoder, such as the encoder 400 shown in FIG. 4. For example, the entropy encoding unit 440 of the encoder 400 shown in FIG. 4 may implement encoding using a context adaptive scan order for entropy coding. In some implementations encoding using a context adaptive scan order, which may be a context-constrained non-zero-probability-adaptive scan order, for entropy coding may include identifying a current block at 810, encoding the current block at 820, transmitting or storing an output bitstream at 830, or any combination thereof.

In some implementations, a current block may be identified at 800. In some implementations, the current block may be a residual block, or a partition thereof. For example, the current block may be identified as a 64×64 residual block, such as the bottom-left 64×64 residual block 610 shown in FIG. 6. In another example, the current block may be identified as a sub-block of a residual block, such as the bottom left 32×32 block 620 shown in FIG. 6, the bottom left 16×16 sub-block 630 shown in FIG. 6, the bottom left 8×8 sub-block 640 shown in FIG. 6, the bottom left 4×4 sub-block 650 shown in FIG. 6, or another size block. Although not expressly shown in FIG. 8, in some implementations, identifying a current block at 800 may include identifying a current block from an input video frame, generating one or more prediction blocks for the current block, generating one or more residual blocks based on the prediction blocks, or a combination thereof), such as by the intra/inter prediction unit 410 shown in FIG. 4.

In some embodiments, the current block may be encoded at 820. For example, the current block may be encoded by an encoder, such as the encoder 400 shown in FIG. 4, which may include generating a transform block at 822 by transforming the residual, or a portion thereof, such as by the transform unit 420 shown in FIG. 4, identifying a scan order at 824, entropy coding the transform block (or the quantized transform block) at 826, or a combination thereof.

In some implementations, a transform block may be generated at 822. In some implementations, generating a transform block at 822 may include partitioning the current residual block into one or more transform partitions, which may be rectangular, including square, partitions for transform coding. In some implementations, video coding using transform partitioning may include selecting a uniform transform partitioning scheme or a multiform transform partitioning scheme, as shown in FIG. 6. In some implementations, generating a transform block at 822 may include transforming the residual block, or residual block partition, into transform coefficients, such as by a transform unit, such as the transform unit 420 shown in FIG. 4. Although not expressly shown in FIG. 8, in some implementations, a quantized transform block may be generated by quantizing the transform block, such as by the quantization unit 430 shown in FIG. 4.

Figure 9:
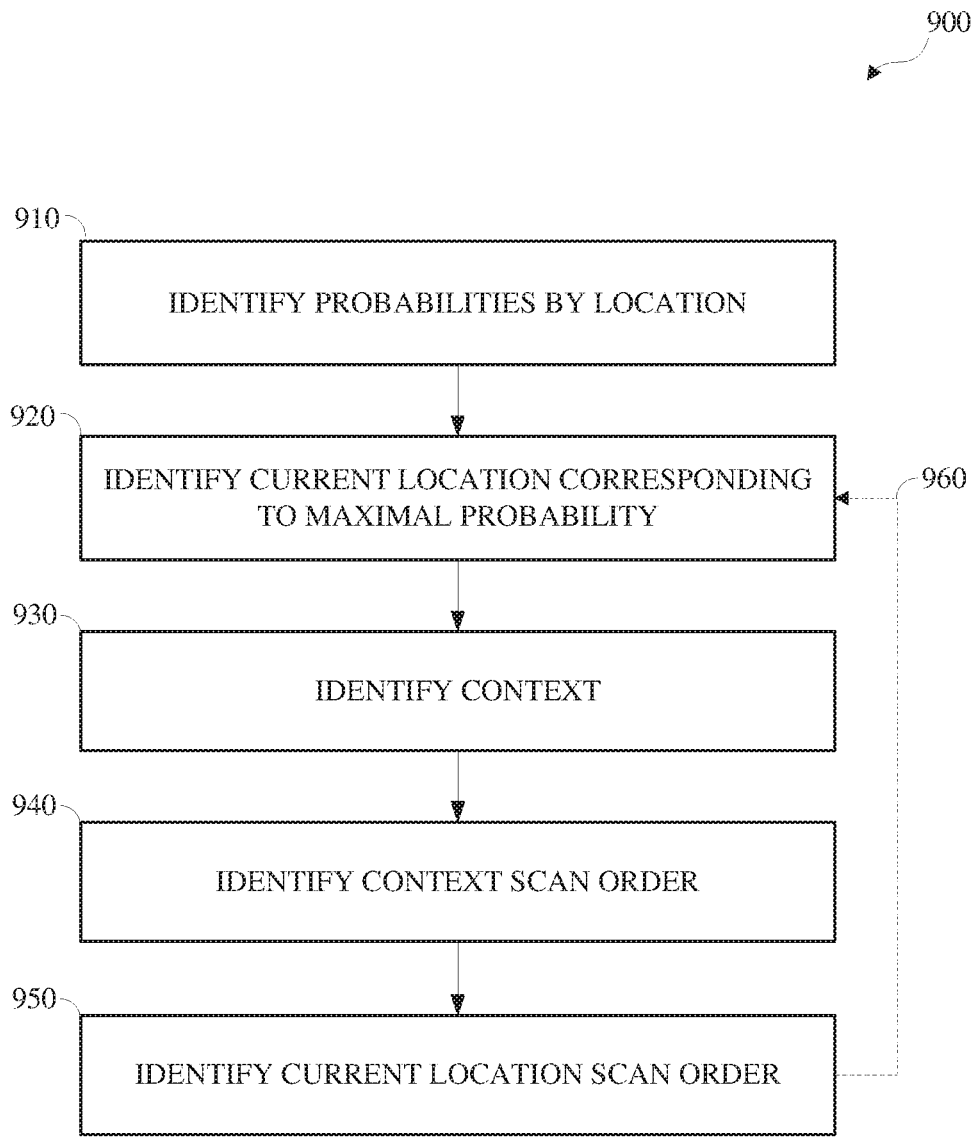
FIG. 9 is a flowchart diagram of identifying a context adaptive scan order for entropy coding in accordance with implementations of this disclosure.

In some implementations, a scan order, such as a context adaptive scan order, may be identified at 824, for entropy coding the transform block, or quantized transform block, identified at 822. In some implementations, identifying a context adaptive scan order at 824 may include identifying a scan order based on non-zero-coefficient probabilities with context preservation, as shown in FIG. 9. In some implementations, the identified scan order may indicate a scan pattern, a direction within the scan pattern, or both.

In some implementations, the transform block (or the quantized transform block) may be entropy coded at 826 based on the context adaptive scan order identified at 824. For example, entropy coding the transform block may include sequentially encoding the transform coefficients from the transform block in the context adaptive scan order identified at 824, including the entropy coded transform coefficient in an encoded output data stream, such as the compressed bitstream 404 shown in FIG. 4, or a combination thereof. In some implementations, a current transform coefficient may be a zero value transform coefficient, the current block of transform coefficients may not include a subsequent non-zero value transform coefficient, and entropy coding for the current block may be complete.

In some implementations, the output bitstream may be transmitted or stored at 830. For example, the output may be transmitted as a signal via a network, such as the network 220 shown in FIG. 2, such that a device, such as the computing device 100 shown in FIG. 1 or the computing and communication devices 100A, 100B, 100C shown in FIG. 2, which may include a decoder, such as the decoder 500 shown in FIG. 5, may receive the signal via the network, may decode the encoded video bitstream, and may generate a reconstructed frame, or a portion of a reconstructed frame, corresponding to the current frame. In another example, the encoded video bitstream may be stored in a memory, such as the memory 150 shown in FIG. 1, of a device, such as the computing device 100 shown in FIG. 1 or the computing and communication devices 100A, 100B, 100C shown in FIG. 2, as a stored encoded video, such that the device, or any other device capable of accessing the memory, may retrieve the stored encoded video, such that a decoder, such as the decoder 500 shown in FIG. 5, may decode the encoded video, and may generate a reconstructed frame, or a portion of a reconstructed frame, corresponding to the current frame.

Other implementations of encoding using a context adaptive scan order for entropy coding as shown in FIG. 8 are available. In implementations, additional elements of encoding using a context adaptive scan order for entropy coding can be added, certain elements can be combined, and/or certain elements can be removed.

FIG. 9 is a flowchart diagram of identifying a context adaptive scan order for entropy coding 900 in accordance with implementations of this disclosure. In some implementations, encoding a transform block, such as the encoding shown at 820 in FIG. 8, may include identifying an unencoded current transform coefficient from the transform block based on a context adaptive scan order, identifying an entropy coding probability distribution for the current transform coefficient, representing the current transform coefficient as a code based on the entropy coding probability distribution, including the code in an encoded output data stream, or a combination thereof. In some implementations, the entropy coding probability distributions may be based on estimated probabilities, calculated probabilities, or a combination of estimated and calculated probabilities, that the symbols will appear in the input data stream, and may be ordered so that the shortest codes may be associated with the most frequently appearing symbols (coefficients).

In some implementations, identifying a context adaptive scan order for entropy coding 900 may be implemented in an encoder, such as the encoder 400 shown in FIG. 4. For example, the entropy encoding unit 440 of the encoder 400 shown in FIG. 4 may identify a context adaptive scan order for entropy coding. In some implementations, identifying a context adaptive scan order for entropy coding at 900 in FIG. 9 may be similar to the identifying a context adaptive scan order for entropy coding as shown at 824 in FIG. 8. In some implementations identifying a context adaptive scan order for entropy coding 900 may include identifying transform coefficient probabilities at 910, identifying a current transform coefficient location at 920, identifying context locations at 930, identifying a context location scan order at 940, identifying a current location scan order at 950, or any combination thereof.

In some implementations, transform coefficient probabilities may be identified at 910. The transform coefficient probabilities, or non-zero-coefficient probabilities, may indicate, for each location or position in the transform block, a respective probability that the corresponding transform coefficient is a non-zero coefficient. In some implementations, the current transform coefficient may be a zero value transform coefficient, the current block of transform coefficients may not include a subsequent non-zero value transform coefficient, and entropy coding for the current block may be complete.

In some implementations, identifying the non-zero-coefficient probabilities at 910 may include generating, maintaining, tracking, or a combination thereof, statistics indicating probabilities for respective locations in the transform block that the location includes a non-zero-coefficient. For example, the non-zero-coefficient probabilities for a current block may be updated non-zero-coefficient probabilities, which may be the non-zero-coefficient probabilities used for encoding a previously coded block updated based on non-zero-coefficient counts for the previously coded block.

In some implementations, the transform coefficient probabilities may be identified at 910 based on one or more previously coded frames, estimated probabilities for the current frame, or a combination thereof. In some implementations, for a previously coded frame (the i-th frame), (r) may indicate a frequency index in the vertical direction, which may correspond to a row number in the transform coefficient matrix, (c) may indicate a frequency index in the horizontal direction, which may correspond with a column number in the transform coefficient matrix, and a count of non-zero coefficients $C[i][r][c]$ may be determined for at each position, or location, (r, c) in the transformed block. The count of non-zero coefficients for respective transform coefficient location $C[i][r][c]$ may be determined for each transformed block in the frame, which may be indicated by a transform block number (M). The transform block number (M) may indicate a number, or cardinality, of transform blocks of a defined size in a frame. In some implementations, a frame may include two or more transform block sizes. For each block size (t) a cardinality M of t-size transform blocks for the frame may be indicated (M(t)), and the count of non-zero coefficients for respective transform coefficient location $C[t][i][r][c]$ may be determined.

The observed probability $Pc[i][r][c]$ of non-zero coefficient at each location of the respective transformed blocks (M) in the previously coded frame (i) may be determined by dividing the count of non-zero coefficients for the respective transform coefficient location $C[i][r][c]$ by the transform block number (M), which may be expressed as $Pc[i][r][c]=C[i][r][c]/M$. In some implementations, estimated probabilities $Pe[i][r][c]$ of non-zero coefficient at each location in respective transformed blocks of the previously coded frame (i) may be identified. The estimated probabilities $Pe[i][r][c]$ may indicate probabilities generated for encoding the previously coded frame.

In some implementations, (a) may indicate an update rate, and non-zero probabilities $Pe[i+1][r][c]$ for transform blocks of a current frame (i+1) may be estimated based on a combination of the estimated probabilities $Pe[i][r][c]$ of non-zero coefficient of the previously coded frame (i) and the observed probability $Pc[i][r][c]$ of non-zero coefficient for the previously coded frame (i), which may be expressed as $Pe[i+1][r][c]=(1-a)*Pe[i][r][c]+a*Pc[i][r][c]$.

In some implementations, a current transform coefficient location may be identified at 920. Identifying the current transform coefficient location may include identifying a maximal non-zero-coefficient probability from the transform coefficient probabilities identified at 910. For example, the maximal non-zero-coefficient probability may be the probability among the transform coefficient probabilities identified at 910 having the highest value, which may correspond to the location in the transform block that is most likely to include a non-zero-coefficient.

In some implementations, identifying the current transform coefficient location at 920 may include identifying the maximal unassigned transform coefficient location from the transform block and omitting transform coefficient locations having assigned positions in the context adaptive scan order from the identification of the current transform coefficient location. In some implementations, identifying a context adaptive scan order for entropy coding 900 may include identifying a current transform coefficient location at 920, identifying context locations at 930, identifying a context location scan order at 940, identifying a current location scan order at 950, or a combination thereof, for each location in the current block sequentially or iteratively as indicated by the broken line at 960.

For example, identifying a current transform coefficient location may include sorting the estimated non-zero probabilities for the current transform block $Pe[i+1][r][c]$, and selecting the current transform coefficient location in the sorted order.

In some implementations, an entropy coding probability distribution for entropy coding a current transform coefficient may be identified or adapted based on one or more entropy coding context locations, such as one or more previously coded transform coefficients for the current block.

In some implementations, entropy coding context locations may be identified at 930. In some implementations, the entropy coding context locations may include previously entropy coded coefficients from the current block that are spatially proximate to the current coefficient. In some implementations, the spatially proximate entropy coding context locations may be identified based on a scan order, which may differ from the context adaptive scan order. For example, the spatially proximate entropy coding context locations may be identified based on a raster scan order, such as the horizontal scan order 710 shown in FIG. 7. For example, the entropy coding context locations may include previously entropy coded transform coefficients that are spatially proximate to the current coefficient in the current block of transform coefficients, such as the coefficient immediately to the left of the current coefficient, the coefficient immediately above the current coefficient, or the coefficient immediately above and to the left of the current coefficient.

In some implementations, the entropy coding context locations for entropy coding a current transform coefficient may include coefficients adjacent to the current coefficient, and may include entropy coding context locations of the coefficients adjacent to the current coefficient. For example, the entropy coding context locations for the coefficient labeled 6 in the horizontal scan order 710 of FIG. 7 may include the coefficients labeled 1, 2, and 5, and the entropy coding context locations for the coefficient labeled 11 in the horizontal scan order 710 of FIG. 7 may include the coefficients labeled 1, 2, 3, 5, 6, 7, 9, and 10.

In some implementations, an entropy coding context location scan order may be identified at 940. In some implementations, the context adaptive scan order may include an assigned scan order for one or more of the entropy coding context locations identified at 930 (assigned entropy coding context locations), and the entropy coding context location scan order from the context adaptive scan order for the entropy coding context locations having an assigned scan order in the context adaptive scan order may be identified as the entropy coding context location scan order at 940. In some implementations, the context adaptive scan order may omit an assigned scan order for one or more of the entropy coding context locations identified at 930 (unassigned entropy coding context locations), and identifying the entropy coding context location scan order at 940 may include sorting the unassigned entropy coding context locations, using a defined scan order, such as the zigzag scan order, or topologically sorting the unassigned entropy coding context locations.

In some implementations, a scan order position in the context adaptive scan order for the current location may be identified at 950. For example, the minimal unassigned (e.g., available) scan order position in the context adaptive scan order, which may be greater than the respective assigned scan order positions identified at 940 for the entropy coding context locations identified at 930, may be identified at 950 as the assigned scan order position in the context adaptive scan order for the current location identified at 920.

In some implementations, identifying the context adaptive scan order may include using the following as input: (len) may indicate a length or size of the current transform block, such as 4 for a 4×4 block or 8 for an 8×8 block; (ci) may indicate a coefficient index corresponding to a location (r, c), which may be expressed as ci=r*len+c; (N) may indicate the number or cardinality of coefficient locations in the transform block, which may be expressed as N=len*len for a square (len×len) block; scan[si] may indicate correlation between scan order (si) and coefficient index (ci), such as a map from scan order (si) to coefficient index (ci); dep[ci] may indicate a list of coefficient indexes for entropy coding context locations of the current coefficient with index ci; visit[ci] may indicate a table, or other data storage structure, that may indicate whether the coefficient with index ci is a previously scanned and coded coefficient. In some implementations, floor( ) may be a function mapping a real number to a largest previous integer, and a location (r, c) for a coefficient index ci may be expressed as r=floor(ci/len), c=ci modulo (%) len.

In some implementations, identifying the context adaptive scan order may include generating the following output: new_scan[si], which may indicate an updated or modified correlation between scan order (si) and coefficient index (ci), such as an updated map from scan order (si) to coefficient index (ci). For example, in a 4×4 square transform block, identifying the coefficient index ci for the fourth scanned coefficient, which may be scan order 3, may be expressed as ci=new_scan[3]. In an example, For example, the coefficient index ci for the fourth scanned coefficient may be seven (ci=new_scan[3]=7), and the coefficient with coefficient index five (ci=5) may be scanned fourth. A location (r, c) for the coefficient with coefficient index seven may be identified based on the corresponding coefficient index ci (ci=7), which may be expressed as r=floor(7/4)=1 and c=7% 4=3, which may indicate that the coefficient at the second row and the fourth column may be scanned fourth. Generating new_scan[si] may be expressed as shown in the following:

```
modify_scan_order(scan, dep)
    new_scan = [ ]
    for ci = 0 to N-1
        visit[ci] = 0
    for si = 0 to N-1
        ci = scan[si]
        topological_sort(ci, dep, new_scan, visit)
    return new_scan
topological_sort(ci, dep, new_scan, visit)
    for nb_ci in dep[ci]
        if visit[nb] == 0
            topological_sort(nb_ci, dep, new_scan)
            new_scan.push(ci)
            visit[ci] = 1
```

Figure 10:
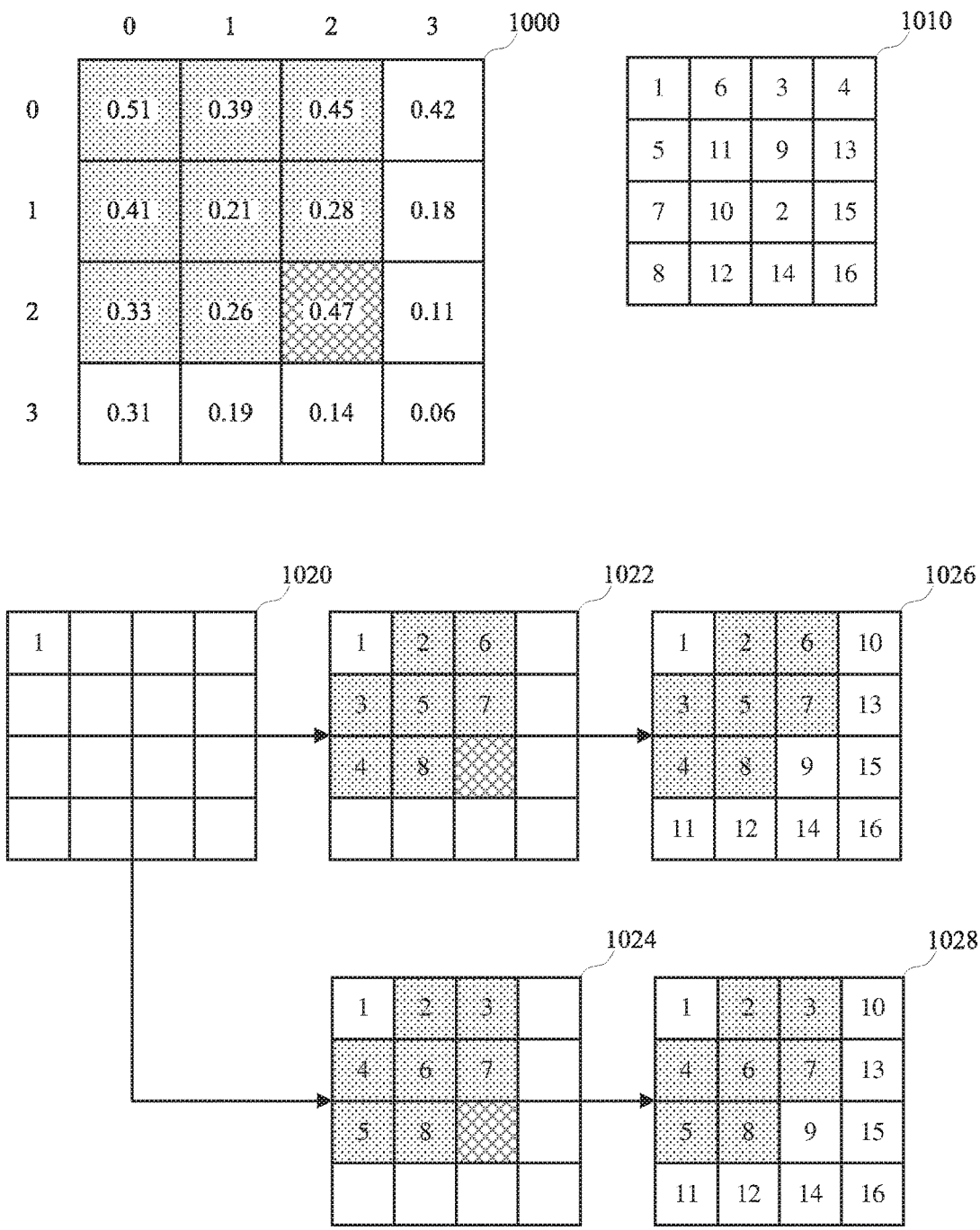
FIG. 10 shows diagrams of an example of an estimated non-zero-coefficient probability matrix for a transform block, an example of a corresponding magnitude based scan order, and examples of corresponding context adaptive scan orders in accordance with implementations of this disclosure.

FIG. 10 shows diagrams of an example of an estimated non-zero-coefficient probability matrix 1000 for a transform block, an example of a corresponding magnitude based scan order 1010, and examples of corresponding context adaptive scan orders 1020-1028 in accordance with implementations of this disclosure.

In some implementations, the estimated non-zero-coefficient probability matrix 1000 may be an estimated non-zero-coefficient probability matrix. For example, the estimated non-zero-coefficient probability matrix 1000 may be an estimated non-zero-coefficient probability matrix identified as shown at 910 in FIG. 9. As shown in FIG. 10, the estimated non-zero-coefficient probability matrix 1000 indicates, for each coefficient location in a transform block, an estimated probability that the corresponding coefficient in a transform block has a non-zero value. For clarity, the location of the transform coefficients, and the corresponding estimated probabilities may be referenced using Cartesian coordinates.

In the example shown in FIG. 10, the estimated non-zero-coefficient probability matrix 1000 indicates that the estimated probability that the transform coefficient at the top-left location (0, 0) in the corresponding transform block is the highest estimated non-zero-coefficient probability (0.51) for the transform block, the estimated probability that the transform coefficient at the third row and third column (2, 2) in the corresponding transform block is the second highest estimated non-zero-coefficient probability (0.47) for the transform block, the estimated probability that the transform coefficient at the first row and third column (0, 2) in the corresponding transform block is the third highest estimated non-zero-coefficient probability (0.45) for the transform block, the estimated probability that the transform coefficient at the first row and fourth column (0, 3) in the corresponding transform block is the fourth highest estimated non-zero-coefficient probability (0.42) for the transform block, the estimated probability that the transform coefficient at the second row and first column (1, 0) in the corresponding transform block is the fifth highest estimated non-zero-coefficient probability (0.41) for the transform block, the estimated probability that the transform coefficient at the first row and second column (0, 1) in the corresponding transform block is the sixth highest estimated non-zero-coefficient probability (0.39) for the transform block, the estimated probability that the transform coefficient at the third row and first column (2, 0) in the corresponding transform block is the seventh highest estimated non-zero-coefficient probability (0.33) for the transform block, the estimated probability that the transform coefficient at the fourth row and first column (3, 0) in the corresponding transform block is the eighth highest estimated non-zero-coefficient probability (0.31) for the transform block, the estimated probability that the transform coefficient at the second row and third column (1, 2) in the corresponding transform block is the ninth highest estimated non-zero-coefficient probability (0.28) for the transform block, the estimated probability that the transform coefficient at the third row and second column (2, 1) in the corresponding transform block is the tenth highest estimated non-zero-coefficient probability (0.26) for the transform block, the estimated probability that the transform coefficient at the second row and second column (1, 1) in the corresponding transform block is the eleventh highest estimated non-zero-coefficient probability (0.21) for the transform block, the estimated probability that the transform coefficient at the fourth row and second column (3, 1) in the corresponding transform block is the twelfth highest estimated non-zero-coefficient probability (0.19) for the transform block, the estimated probability that the transform coefficient at the second row and fourth column (1, 3) in the corresponding transform block is the thirteenth highest estimated non-zero-coefficient probability (0.18) for the transform block, the estimated probability that the transform coefficient at the fourth row and third column (3, 2) in the corresponding transform block is the fourteenth highest estimated non-zero-coefficient probability (0.14) for the transform block, the estimated probability that the transform coefficient at the third row and fourth column (2, 3) in the corresponding transform block is the fifteenth highest estimated non-zero-coefficient probability (0.11) for the transform block, and that the estimated probability that the transform coefficient at the bottom-right location (3, 3) in the corresponding transform block is the lowest estimated non-zero-coefficient probability (0.06) for the transform block.

In some implementations, an entropy coding scan order may be identified based on the magnitude of the estimated non-zero-coefficient probabilities in the estimated non-zero-coefficient probability matrix 1000, such as in order from greatest, highest, or maximal estimated non-zero-coefficient probability to least, lowest, or minimal estimated non-zero-coefficient probability as shown at the magnitude-ordered entropy coding scan order 1010.

For example, in the estimated non-zero-coefficient probability matrix 1000 the estimated probability that the transform coefficient at the top-left location (0, 0) in the corresponding transform block is the highest estimated non-zero probability (0.51) for the transform block, and the minimal or lowest (1) unassigned entropy coding scan order position may be identified as, or assigned as, the entropy coding scan order position for the entropy coding context location at the top-left location (0, 0) as shown at the top-left location (0, 0) of the magnitude-ordered entropy coding scan order 1010. The estimated probability that the transform coefficient at the third row and third column (2, 2) in the corresponding transform block is the second highest estimated non-zero probability (0.47) for the transform block, and the second lowest (2) unassigned entropy coding scan order position may be identified as, or assigned as, the entropy coding scan order position for the entropy coding context location at the third row and third column (2, 2) as shown in the third row and third column (2, 2) of the magnitude-ordered entropy coding scan order 1010. The estimated probability that the transform coefficient at the first row and third column (0, 2) in the corresponding transform block is the third highest estimated non-zero probability (0.45) for the transform block, and the third lowest (3) unassigned entropy coding scan order position may be identified as, or assigned as, the entropy coding scan order position for the entropy coding context location at the first row and third column (0, 2) as shown in the first row and third column (0, 2) of the magnitude-ordered entropy coding scan order 1010. The estimated probability that the transform coefficient at the first row and fourth column (0, 3) in the corresponding transform block is the fourth highest estimated non-zero probability (0.42) for the transform block, and the fourth lowest (4) unassigned entropy coding scan order position may be identified as, or assigned as, the entropy coding scan order position for the entropy coding context location at the first row and fourth column (0, 3) as shown in the first row and fourth column (0, 3) of the magnitude-ordered entropy coding scan order 1010. The estimated probability that the transform coefficient at the second row and first column (1, 0) in the corresponding transform block is the fifth highest estimated non-zero probability (0.41) for the transform block, and the fifth lowest (5) unassigned entropy coding scan order position may be identified as, or assigned as, the entropy coding scan order position for the entropy coding context location at the second row and first column (1, 0) as shown in the second row and first column (1, 0) of the magnitude-ordered entropy coding scan order 1010. The estimated probability that the transform coefficient at the first row and second column (0, 1) in the corresponding transform block is the sixth highest estimated non-zero probability (0.39) for the transform block, and the sixth lowest (6) unassigned entropy coding scan order position may be identified as, or assigned as, the entropy coding scan order position for the entropy coding context location at the first row and second column (0, 1) as shown in the first row and second column (0, 1) of the magnitude-ordered entropy coding scan order 1010. The estimated probability that the transform coefficient at the third row and first column (2, 0) in the corresponding transform block is the seventh highest estimated non-zero probability (0.33) for the transform block, and the seventh lowest (7) unassigned entropy coding scan order position may be identified as, or assigned as, the entropy coding scan order position for the entropy coding context location at the third row and first column (2, 0) as shown in the third row and first column (2, 0) of the magnitude-ordered entropy coding scan order 1010. The estimated probability that the transform coefficient at the fourth row and first column (3, 0) in the corresponding transform block is the eighth highest estimated non-zero probability (0.31) for the transform block, and the eighth lowest (8) unassigned entropy coding scan order position may be identified as, or assigned as, the entropy coding scan order position for the entropy coding context location at the fourth row and first column (3, 0) as shown in the fourth row and first column (3, 0) of the magnitude-ordered entropy coding scan order 1010. The estimated probability that the transform coefficient at the second row and third column (1, 2) in the corresponding transform block is the ninth highest estimated non-zero probability (0.28) for the transform block, and the ninth lowest (9) unassigned entropy coding scan order position may be identified as, or assigned as, the entropy coding scan order position for the entropy coding context location at the second row and third column (1, 2) as shown in the second row and third column (1, 2) of the magnitude-ordered entropy coding scan order 1010. The estimated probability that the transform coefficient at the third row and second column (2, 1) in the corresponding transform block is the tenth highest estimated non-zero probability (0.26) for the transform block, and the tenth lowest (10) unassigned entropy coding scan order position may be identified as, or assigned as, the entropy coding scan order position for the entropy coding context location at the third row and second column (2, 1) as shown in the third row and second column (2, 1) of the magnitude-ordered entropy coding scan order 1010. The estimated probability that the transform coefficient at the second row and second column (1, 1) in the corresponding transform block is the eleventh highest estimated non-zero probability (0.21) for the transform block, and the eleventh lowest (11) unassigned entropy coding scan order position may be identified as, or assigned as, the entropy coding scan order position for the entropy coding context location at the second row and second column (1, 1) as shown in the second row and second column (1, 1) of the magnitude-ordered entropy coding scan order 1010. The estimated probability that the transform coefficient at the fourth row and second column (3, 1) in the corresponding transform block is the twelfth highest estimated non-zero probability (0.19) for the transform block, and the twelfth lowest (12) unassigned entropy coding scan order position may be identified as, or assigned as, the entropy coding scan order position for the entropy coding context location at the fourth row and second column (3, 1) as shown in the fourth row and second column (3, 1) of the magnitude-ordered entropy coding scan order 1010. The estimated probability that the transform coefficient at the second row and fourth column (1, 3) in the corresponding transform block is the thirteenth highest estimated non-zero probability (0.18) for the transform block, and the thirteenth lowest (13) unassigned entropy coding scan order position may be identified as, or assigned as, the entropy coding scan order position for the entropy coding context location at the second row and fourth column (1, 3) as shown in the second row and fourth column (1, 3) of the magnitude-ordered entropy coding scan order 1010. The estimated probability that the transform coefficient at the fourth row and third column (3, 2) in the corresponding transform block is the fourteenth highest estimated non-zero probability (0.14) for the transform block, and the fourteenth lowest (14) unassigned entropy coding scan order position may be identified as, or assigned as, the entropy coding scan order position for the entropy coding context location at the fourth row and third column (3, 2) as shown in the fourth row and third column (3, 2) of the magnitude-ordered entropy coding scan order 1010. The estimated probability that the transform coefficient at the third row and fourth column (2, 3) in the corresponding transform block is the fifteenth highest estimated non-zero probability (0.11) for the transform block, and the fifteenth lowest (15) unassigned entropy coding scan order position may be identified as, or assigned as, the entropy coding scan order position for the entropy coding context location at the third row and fourth column (2, 3) as shown in the third row and fourth column (2, 3) of the magnitude-ordered entropy coding scan order 1010. The estimated probability that the transform coefficient at the bottom-right location (3, 3) in the corresponding transform block is the lowest estimated non-zero probability (0.06) for the transform block, and the highest or maximal (16) unassigned entropy coding scan order position may be identified as, or assigned as, the entropy coding scan order position for the entropy coding context location at the bottom-right location (3, 3) as shown at the bottom-right location (3, 3) of the magnitude-ordered entropy coding scan order 1010.

In some implementations, a context adaptive scan order may be identified based on the magnitude of the estimated non-zero-coefficient probabilities in the estimated non-zero-coefficient probability matrix 1000 and context ordering as shown by the context adaptive scan orders 1020-1028.

For example, in the estimated non-zero-coefficient probability matrix 1000 the estimated probability that the transform coefficient at the top-left location (0, 0) in the corresponding transform block is the highest estimated non-zero probability (0.51) for the transform block, and the minimal or lowest (1) unassigned context adaptive scan order position may be identified as, or assigned as, the context adaptive scan order position for the entropy coding context location at the top-left location (0, 0) as shown at the top-left location (0, 0) of the first context adaptive scan order 1020.

In the estimated non-zero-coefficient probability matrix 1000 the estimated probability that the transform coefficient at the third row and third column (2, 2) in the corresponding transform block is the second highest estimated non-zero probability (0.47) for the transform block, and the non-zero-coefficient probability location at the third row and third column (2, 2) is shown with cross-hatching to indicate that, with respect to the first context adaptive scan order 1020, the non-zero-coefficient probability location at the third row and third column (2, 2) is the current non-zero-coefficient probability location.

In some implementations, entropy coding context locations may be identified for the current non-zero-coefficient probability location. For example, entropy coding context locations may be identified for the current non-zero-coefficient probability location as indicated at 920 in FIG. 9. In some implementations, the entropy coding context locations may be identified based a defined context selection scheme. For example, in the estimated non-zero-coefficient probability matrix 1000 shown in FIG. 10, the locations—(0, 0), (0, 1), (0, 2), (1, 0), (1, 1), (1, 2), (2, 0), and (2, 1)—above, to the left of, and above and to the left of the current non-zerocoefficient probability location (2, 2) may be identified as entropy coding context coefficients for the current non-zero-coefficient probability location (2, 2), as indicated by the stippled background in the estimated non-zero-coefficient probability matrix 1000.

In some implementations, the context adaptive scan order may include assigned context adaptive scan order positions for one or more of the entropy coding context locations. For example, the first context adaptive scan order 1020 includes an assigned context adaptive scan order position (1) for the top-left entropy coding context location (0, 0).

In some implementations, the context adaptive scan order may omit assigned context adaptive scan order positions for one or more of the entropy coding context locations. For example, the first context adaptive scan order 1020 omits assigned context adaptive scan order positions for the entropy coding context locations—(0, 1), (0, 2), (1, 0), (1, 1), (1, 2), (2, 0), and (2, 1)—other than the top-left entropy coding context location (0, 0). For simplicity, the entropy coding context locations for which the context adaptive scan order omits assigned context adaptive scan order positions may be referred to as unassigned entropy coding context locations.

In some implementations, assigned context adaptive scan order positions may be identified for the unassigned entropy coding context locations. For example, assigned context adaptive scan order positions may be identified for the unassigned entropy coding context locations as shown at 940 in FIG. 9. In some implementations, the assigned context adaptive scan order positions may be identified for the unassigned entropy coding context locations, which may be a set of unassigned entropy coding context locations, based on a defined scan order or based on topologically, or recursively, sorting the unassigned entropy coding context locations.

In FIG. 10, the second context adaptive scan order 1022 includes assigned context adaptive scan order positions for the entropy coding context locations identified for the current non-zero-coefficient probability location. The location indicated with the cross-hatched background in the second context adaptive scan order 1022 corresponds with the current non-zero-coefficient probability location (2, 2). The top-left entropy coding context location (0, 0) in the second context adaptive scan order 1022 indicates the assigned context adaptive scan order position (1) assigned based on the magnitude of the corresponding estimated probability. The entropy coding context locations—(0, 1), (0, 2), (1, 0), (1, 1), (1, 2), (2, 0), and (2, 1)—indicated by the stippled background in the second context adaptive scan order 1022 include assigned context adaptive scan order positions (2-8) assigned based on zigzag scan order. In some implementations, the transform block may be generated using, for example, a two-dimensional (2D) DCT transform, and the zigzag scan order may correspond with an ascending transform frequency based scan order.

The third context adaptive scan order 1024 includes assigned context adaptive scan order positions for the entropy coding context locations identified by topologically, or recursively, sorting the entropy coding context locations based on non-zero-coefficient probability magnitude. The location indicated with the cross-hatched background in the third context adaptive scan order 1024 corresponds with the current non-zero-coefficient probability location (2, 2). The top-left entropy coding context location (0, 0) in the third context adaptive scan order 1024 indicates the assigned context adaptive scan order position (1) assigned based on the magnitude of the corresponding estimated probability. The entropy coding context locations—(0, 1), (0, 2), (1, 0), (1, 1), (1, 2), (2, 0), and (2, 1)—indicated by the stippled background in the third context adaptive scan order 1024 include assigned context adaptive scan order positions (2-8) assigned based on topologically, or recursively, sorting the entropy coding context locations based on non-zero-coefficient probability magnitude.

In some implementations, topologically, or recursively, sorting the entropy coding context locations based on non-zero-coefficient probability magnitude may include identifying a current entropy coding context location, identifying context locations for the current entropy coding context location, identifying a context location scan order, identifying a current location scan order, or a combination thereof.

Identifying a current entropy coding context location may be similar to identifying a current transform coefficient location as shown at 920 in FIG. 9, except that the current entropy coding context location may be the entropy coding context location having the greatest magnitude. For example, in FIG. 10, the entropy coding context location (0, 2) having the greatest magnitude (0.45) among the entropy coding context locations indicated by the stippled background in the third context adaptive scan order 1024 may be identified as the current entropy coding context location.

Identifying context locations for the current entropy coding context location may be similar to identifying context locations as shown at 930 in FIG. 9, except that the context locations may be identified based on the current entropy coding context location. For example, in FIG. 10, in the third context adaptive scan order 1024 the current entropy coding context location may be the entropy coding context location (0, 2), and the context locations for the current entropy coding context location (0, 2) may be identified as the context locations (0, 0) and (0, 1).

Identifying a context location scan order may be similar to the context scan order identification shown at 940 in FIG. 9, except that the context location scan order may be identified for the context locations (0, 0) and (0, 1) for the current entropy coding context location (0, 2). As shown in in the third context adaptive scan order 1024, the top-left entropy coding context location (0, 0) in the third context adaptive scan order 1024 indicates the assigned context adaptive scan order position (1) assigned based on the magnitude of the corresponding estimated probability. The minimal or lowest (2) unassigned context adaptive scan order position may be identified as, or assigned as, the context adaptive scan order position for the entropy coding context location (0, 1) as shown in the third context adaptive scan order 1024.

Identifying a current location scan order for the current entropy coding context location (0, 2) may be similar to identifying a current location scan order at 950 as shown in FIG. 9, except that the current location scan order may be identified for the current entropy coding context location (0, 2). For example, the minimal or lowest (3) unassigned context adaptive scan order position may be identified as, or assigned as, the context adaptive scan order position for the current entropy coding context location (0, 2) as shown in the third context adaptive scan order 1024.

In the example shown at 1024, the entropy coding context location (1, 0) having the greatest magnitude (0.41) among the unassigned entropy coding context locations indicated by the stippled background in the third context adaptive scan order 1024, such as subsequent to assigning the third scan order to the entropy coding context location (0, 2), may be identified as the current entropy coding context location, the context locations for the current entropy coding context location (1, 0) may be identified as the context location (0, 0), the entropy coding context location (0, 0) may have an assigned context adaptive scan order position (1) and the minimal or lowest (4) unassigned context adaptive scan order position may be identified as, or assigned as, the context adaptive scan order position for the current entropy coding context location (1, 0) as shown in the third context adaptive scan order 1024.

In the example shown at 1024, the entropy coding context location (2, 0) having the greatest magnitude (0.33) among the unassigned entropy coding context locations indicated by the stippled background in the third context adaptive scan order 1024, such as subsequent to assigning the fourth scan order to the entropy coding context location (1, 0), may be identified as the current entropy coding context location, the context locations (0, 0) and (1, 0) for the current entropy coding context location (2, 0) may have assigned context adaptive scan order positions, and the minimal or lowest (5) unassigned context adaptive scan order position may be identified as, or assigned as, the context adaptive scan order position for the current entropy coding context location (2, 0) as shown in the third context adaptive scan order 1024.

In the example shown at 1024, the entropy coding context location (1, 2) having the greatest magnitude (0.28) among the unassigned entropy coding context locations indicated by the stippled background in the third context adaptive scan order 1024, such as subsequent to assigning the fifth scan order to the entropy coding context location (2, 0), may be identified as the current entropy coding context location, the context locations (0, 0), (0, 1), (0, 2), and (1, 0), for the current entropy coding context location (2, 0) may have assigned context adaptive scan order positions, the context location (1, 1) for the current entropy coding context location (2, 0) may be an unassigned context location, the minimal or lowest (6) unassigned context adaptive scan order position may be identified as, or assigned as, the context adaptive scan order position for the unassigned context location (1, 1), and the next minimal or lowest (7) unassigned context adaptive scan order position may be identified as, or assigned as the context adaptive scan order position for the current entropy coding context location (1, 2) as shown in the third context adaptive scan order 1024.

In the example shown at 1024, the entropy coding context location (2, 1) having the greatest magnitude (0.26) among the unassigned entropy coding context locations indicated by the stippled background in the third context adaptive scan order 1024, such as subsequent to assigning the seventh scan order to the entropy coding context location (1, 2), may be identified as the current entropy coding context location, the context locations (0, 0), (0, 1), (1, 0), (1, 1), and (2, 0) for the current entropy coding context location (2, 0) may have assigned context adaptive scan order positions, and the next minimal or lowest (8) unassigned context adaptive scan order position may be identified as, or assigned as the context adaptive scan order position for the current entropy coding context location (2, 1) as shown in the third context adaptive scan order 1024.

The fourth context adaptive scan order 1026 includes assigned context adaptive scan order positions for the estimated non-zero-coefficient probability matrix 1000 as shown in the second context adaptive scan order 1022, and includes assigned context adaptive scan order positions (9-16) for the entropy coding context locations—(2, 2), (0, 3), (3, 0), (3, 1), (1, 3), (3, 2), (2, 3), and (3, 3)—assigned based on the magnitude of the corresponding estimated probabilities.

The fifth context adaptive scan order 1028 includes assigned context adaptive scan order positions for the estimated non-zero-coefficient probability matrix 1000 as shown in the third context adaptive scan order 1024, and includes assigned context adaptive scan order positions (9-16) for the entropy coding context locations—(2, 2), (0, 3), (3, 0), (3, 1), (1, 3), (3, 2), (2, 3), and (3, 3)—assigned based on the magnitude of the corresponding estimated probabilities.

Figure 11:
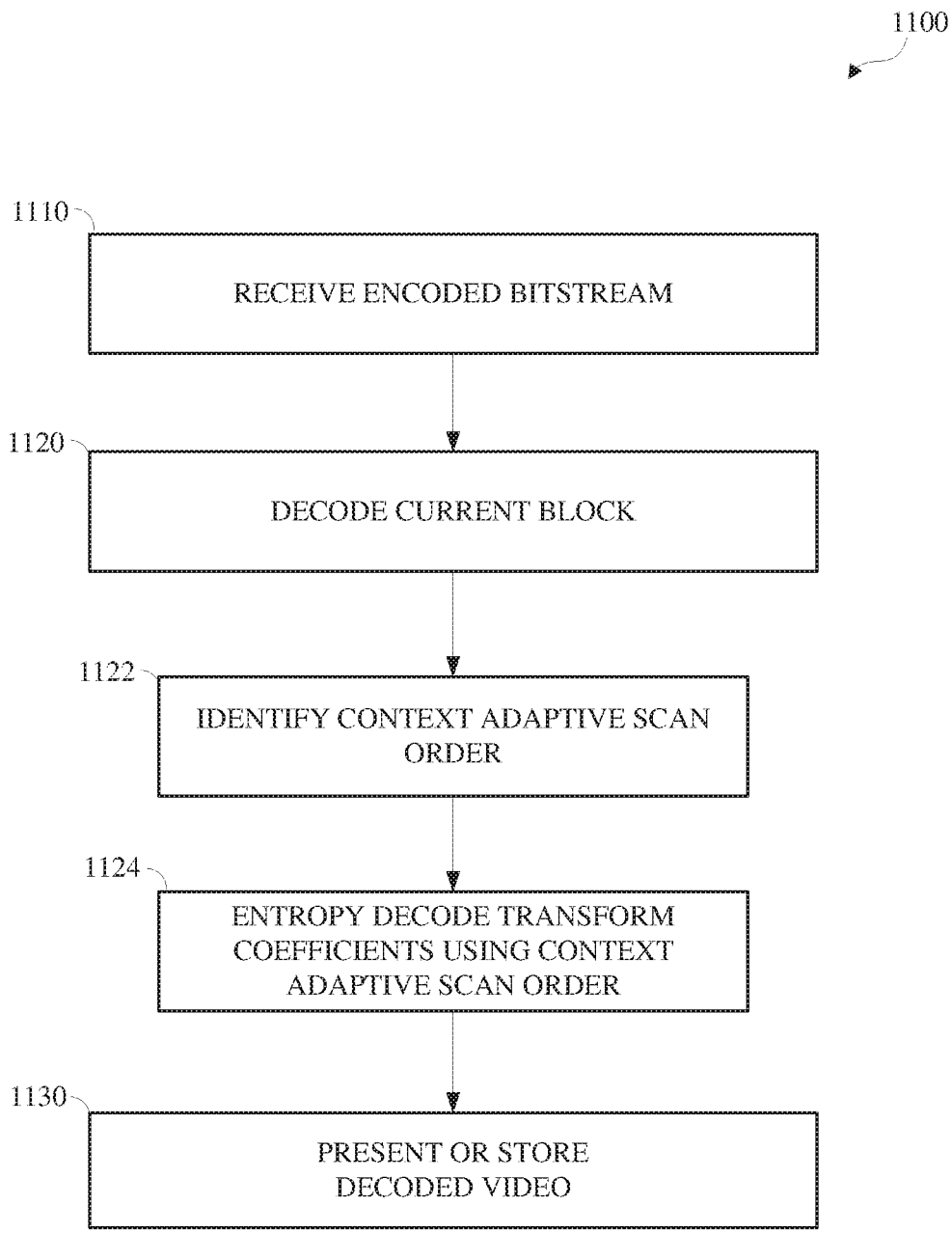
FIG. 11 is a flowchart diagram of decoding using a context adaptive scan order for entropy coding in accordance with implementations of this disclosure.

FIG. 11 is a flowchart diagram of decoding using a context adaptive scan order for entropy coding in accordance with implementations of this disclosure. In some implementations, decoding using a context adaptive scan order for entropy coding 1100 may be implemented in a decoder, such as the decoder 500 shown in FIG. 5. For example, the entropy decoding unit 510 of the decoder 500 shown in FIG. 5 may implement decoding using a context adaptive scan order for entropy coding. In some implementations decoding using a context adaptive scan order for entropy coding may include receiving an encoded bitstream, or a portion thereof, at 1110, decoding a current block at 1120, presenting or storing the decoded video at 1130, or any combination thereof.

In some implementations, decoding the current block at 1120 may include identifying a context adaptive scan order at 1122, entropy decoding the transform coefficients (or the quantized transform coefficients) at 1124, or a combination thereof. In some implementations, identifying the context adaptive scan order at 1122 may be similar to identifying a context adaptive scan order for entropy coding as shown at 900 in FIG. 9.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASIC s), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   receiving an encoded video stream;
   generating, by a processor in response to instructions stored on a non-transitory computer readable medium, a decoded block by decoding a current block of a current frame of a video stream from the encoded video stream, wherein decoding the current block includes:
   identifying a context adaptive scan order for entropy decoding a transform block, wherein identifying the context adaptive scan order includes:
      identifying non-zero-coefficient probabilities for the transform block such that each location in the transform block corresponds to a respective non-zero coefficient probability that the location includes a non-zero coefficient;
      identifying a current location in the transform block corresponding to a maximal non-zero-coefficient probability from the non-zero-coefficient probabilities wherein the context adaptive scan order omits an assigned scan order position for the current location;
      identifying an entropy coding context location in the transform block based on the current location;
      on a condition that the context adaptive scan order includes an assigned scan order position for the entropy coding context location, identifying a minimal available scan order position from the context adaptive scan order the assigned scan order position for the current location; and
      on a condition that the context adaptive scan order omits the assigned scan order position for the entropy coding context location:
         determining the assigned scan order position for the entropy coding context location; and
         identifying a minimal available scan order position from the context adaptive scan order the assigned scan order position for the current location such that the assigned scan order position for the current location is greater than the assigned scan order position for the entropy coding context location;
   determining a transform coefficient by entropy decoding the transform coefficient from the encoded video stream based on the context adaptive scan order;
   including the transform coefficient in the transform block; and
   reconstructing the decoded block based on the transform block; and
   presenting or storing the decoded block.

2. The method of claim 1, wherein identifying the entropy coding context location includes identifying a plurality of entropy coding context locations, wherein the entropy coding context location is one of the plurality of entropy coding context locations, and wherein determining the assigned scan order position for the entropy coding context location includes determining a scan order for the plurality of entropy coding context locations.

3. The method of claim 2, wherein determining the scan order for the plurality of entropy coding context locations includes identifying an ascending transform frequency based scan order as the scan order for the plurality of entropy coding context locations.

4. The method of claim 2, wherein determining the scan order for the plurality of entropy coding context locations includes:
- identifying a set of unassigned entropy coding context locations from the plurality of entropy coding context locations such that the context adaptive scan order for entropy coding the transform block omits a respective assigned scan order position for each unassigned entropy coding context location from the set of unassigned entropy coding context locations; and
- identifying a context adaptive scan order as the scan order for entropy coding the set of unassigned entropy coding context locations.

5. The method of claim 4, wherein identifying the context adaptive scan order as the scan order for entropy coding the set of unassigned entropy coding context locations includes:
- identifying a second current location from the unassigned entropy coding context locations corresponding to a maximal non-zero-coefficient probability from the non-zero coefficient probabilities corresponding to the respective unassigned entropy coding context locations wherein the context adaptive scan order omits an assigned scan order position for the second current location;
- identifying a second entropy coding context location in the transform block based on the second current location;
- on a condition that that context adaptive scan order includes an assigned scan order position for the second entropy coding context location, identifying a minimal available scan order position from the context adaptive scan order as the assigned scan order position for the second current location; and
- on a condition that the context adaptive scan order omits the assigned scan order position for the second entropy coding context location:
  - determining a second assigned scan order position for the second entropy coding context location; and
  - identifying a second minimal available scan order position from the context adaptive scan order as the assigned scan order position for the second current location such that the assigned scan order position for the second current location exceeds the assigned scan order position for the second entropy coding context location.

6. The method of claim 1, wherein each non-zero-coefficient probability from the non-zero-coefficient probabilities indicates a probability that a corresponding location in the transform block includes a non-zero coefficient.

7. The method of claim 1, wherein entropy decoding the transform coefficient includes:
- identifying, based on the entropy coding context location, an entropy coding probability distribution for entropy decoding the transform coefficient; and
- entropy decoding the transform coefficient using the entropy coding probability distribution.

8. The method of claim 1, further comprising:
- generating updated non-zero-coefficient probabilities based on the transform block; and
- entropy decoding a subsequent transform block from the encoded video stream based on the updated non-zero-coefficient probabilities.

9. A method comprising:
- receiving an encoded video stream;
- generating, by a processor in response to instructions stored on a non-transitory computer readable medium, a decoded block by decoding a current block of a current frame of a video stream from the encoded video stream, wherein decoding the current block includes:
  - identifying a context adaptive scan order for entropy decoding a transform block, wherein identifying the context adaptive scan order includes:
    - identifying non-zero-coefficient probabilities for the transform block such that each location in the transform block corresponds to a respective non-zero coefficient probability that the location includes a non-zero coefficient; and
    - assigning a respective context adaptive scan order position to each location in the transform block in descending magnitude order of the corresponding non-zero-coefficient probabilities such that the context adaptive scan order position for each location is greater than the context adaptive scan order position assigned to entropy coding context locations for the respective location;
  - generating the transform block by:
    - entropy decoding transform coefficients from the encoded video stream based on the context adaptive scan order to generate entropy decoded transform coefficients; and
    - including the entropy decoded transform coefficients in the transform block; and
  - reconstructing the decoded block based on the transform block; and
- presenting or storing the decoded block.

10. The method of claim 9, wherein assigning the respective context adaptive scan order position to each location in the transform block includes identifying the entropy coding context locations.

11. The method of claim 10, wherein identifying the entropy coding context locations includes identifying a plurality of entropy coding context locations.

12. The method of claim 11, wherein assigning the respective context adaptive scan order position to each location in the transform block includes determining a scan order for the plurality of entropy coding context locations.

13. The method of claim 12, wherein determining the scan order for the plurality of entropy coding context locations includes identifying an ascending transform frequency based scan order as the scan order for the plurality of entropy coding context locations.

14. The method of claim 12, wherein determining the scan order for the plurality of entropy coding context locations includes:
- identifying a set of unassigned entropy coding context locations from the plurality of entropy coding context locations such that the context adaptive scan order for entropy coding the transform block omits a respective assigned context adaptive scan order position for each unassigned entropy coding context location from the set of unassigned entropy coding context locations; and
- identifying a context adaptive scan order as the scan order for entropy coding the set of unassigned entropy coding context locations.

15. The method of claim 9, wherein each non-zero-coefficient probability from the non-zero-coefficient probabilities indicates a probability that a corresponding location in the transform block includes a non-zero coefficient.

16. The method of claim 9, wherein entropy decoding the transform coefficients includes:
- for each transform coefficient from the transform coefficients:
  - identifying, based on the entropy coding context location corresponding to the transform coefficient, an entropy coding probability distribution for entropy decoding the transform coefficient; and entropy decoding the transform coefficient using the entropy coding probability distribution.

17. The method of claim 9, further comprising:

generating updated non-zero-coefficient probabilities based on the decoded transform coefficients; and entropy decoding a subsequent block from the encoded video stream based on the updated non-zero-coefficient probabilities.

18. A method comprising:

generating, by a processor in response to instructions stored on a non-transitory computer readable medium, an encoded block by encoding a current block of a current frame of a video stream, wherein encoding the current block includes:

generating a transform block based on the current block;

identifying a context adaptive scan order for entropy coding the transform block, wherein identifying the context adaptive scan order includes:

identifying non-zero-coefficient probabilities for the transform block such that each location in the transform block corresponds to a respective probability that the location includes a non-zero coefficient;

identifying a current location in the transform block corresponding to a maximal non-zero-coefficient probability from the non-zero-coefficient probabilities wherein the context adaptive scan order omits an assigned scan order position for the current location;

identifying an entropy coding context location in the transform block based on the current location;

on a condition that that context adaptive scan order includes an assigned scan order position for the entropy coding context location, identifying a minimal available scan order position from the context adaptive scan order as the assigned scan order position for the current location; and on a condition that the context adaptive scan order omits the assigned scan order position for the entropy coding context location:

determining the assigned scan order position for the entropy coding context location; and identifying a minimal available scan order position from the context adaptive scan order as the assigned scan order position for the current location such that the assigned scan order position for the current location is greater than the assigned scan order position for the entropy coding context location;

identifying a transform coefficient from the transform block based on the context adaptive scan order;

generating an entropy coded value by entropy coding the transform coefficient;

and including the entropy coded value in an output bitstream; and transmitting or storing the output bitstream.

19. The method of claim 18, wherein identifying the entropy coding context location includes identifying a plurality of entropy coding context locations, wherein the entropy coding context location is one of the plurality of entropy coding context locations, and wherein determining the assigned scan order position for the entropy coding context location includes identifying an ascending transform frequency based scan order for the plurality of entropy coding context locations.

20. The method of claim 18, wherein identifying the entropy coding context location includes identifying a plurality of entropy coding context locations, wherein the entropy coding context location is one of the plurality of entropy coding context locations, and wherein determining the assigned scan order position for the entropy coding context location includes:

identifying a set of unassigned entropy coding context locations from the plurality of entropy coding context locations such that the context adaptive scan order for entropy coding the transform block omits a respective assigned scan order position for each unassigned entropy coding context location from the set of unassigned entropy coding context locations; and identifying a context adaptive scan order for entropy coding the set of unassigned entropy coding context locations.

* * * * *